United States Patent Office 2,998,447
Patented Aug. 29, 1961

2,998,447
CONVERSION OF UNSATURATED ALDEHYDES TO MONOMERIC PRODUCTS
Harry De V. Finch, Berkeley, and Edward A. Youngman, Lafayette, Calif., assignors to Shell Oil Company, New York, N.Y., a corporation of Delaware
No Drawing. Filed Dec. 29, 1958, Ser. No. 783,093
5 Claims. (Cl. 260—486)

This invention relates to the preparation of valuable monomeric products by condensation of alpha,beta-unsaturated aldehydes by aluminum alcoholates. Particularly, this invention relates to an improved process for the preparation of allyl acrylate and allyl alcohol by condensation of acrolein by aluminum alcoholates.

The prior art teaches that alpha-methylidene aldehydes can be condensed by aluminum alcoholates to form valuable monomeric products, an example being the production of allyl acrylate and allyl alcohol from acrolein. Typical of the processes for effecting the condensation is the process shown for condensation of acrolein by Hearne and Schwarzer in United States Patent No. 2,516,627, and the process shown for condensation of methacrolein by Bludworth in United States Patent No. 2,250,520.

The alpha-methylidene aldehydes are the alpha, beta-ethylenically unsaturated aldehydes having a terminal methylene group; such aldehydes thus may be represented by the formula:

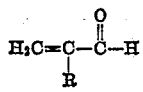

wherein R represents hydrogen (as in acrolein) or hydrocarbon, preferably lower alkyl (as in methacrolein and the like). The most widely available of these compounds are the alpha-methylidene alkanals—i.e., R represents hydrogen or lower alkyl.

In a typical process for effecting condensation of alpha-methylidene aldehydes by aluminum alcoholates, the aldehyde is reacted under substantially anhydrous conditions in the presence of the aluminum alcoholate, a liquid solvent reaction medium often being used. The product monomer ester and unreacted aldehyde are recovered from the reaction mixture and are separated, and the unreacted aldehyde is recycled. As will be pointed out in more detail hereinafter, the aldehyde reactant reacts with the aluminum alcoholate, the alkenyl group of the aldehyde replacing one or more of the alkyl groups of the alcoholate. Consequently, it is also desirable that, before the spent catalyst is discarded, it be treated with water or aqueous solution of strong acid or strong base to hydrolyze the alcoholate to free the alcohol. The alcohol produced will be at least in part, and usually will be primarily, the unsaturated alcohol containing the alkenyl group corresponding to the aldehyde reactant. Recycle of the unreacted aldehyde and recovery of the alcohol from the spent catalyst are both essential to the economic feasibility of such processes.

In copending application Serial No. 783,094 filed December 29, 1958, there is disclosed and claimed a further improved process for the conversion of acrolein to valuable monomeric products. By conducting the reaction in the manner described in said copending application, very high yields of monomeric products from the converted aldehyde are obtained. However, such a process requires recycle of a substantial part—in most cases, a major part—of the aldehyde fed. Since the condensation of the aldehyde requires that the reaction mixture be substantially anhydrous, the recycled aldehyde must be substantially anhydrous.

In operation of the aforesaid processes for condensing alpha-methylidene aldehydes, there are encountered serious problems. First, the product monomer ester and any unreacted aldehyde must be recovered from a reaction mixture containing the aluminum alcoholate catalyst. Since the aldehyde is highly reactive, particularly in the reaction mixture containing the catalyst, great care must be taken to effect recovery of the ester and unreacted aldehyde without substantial loss of either or both or those materials to undesirable side reactions during the recovery step. This problem is particularly serious when condensation of the aldehyde is conducted on a large scale, since it is very difficult in such operations to maintain the necessary careful, critical control of the reaction conditions essential to complete recovery of the ester and unreacted aldehyde.

Second, recovery of the ester and unreacted aldehyde from the final reaction mixture is further complicated because of the physical character of that mixture, and because of the requirements of the processes involved. In effecting condensation of the aldehyde, it is essential that substantially no water be present in the reaction mixture, for the presence of water therein results in decomposition of the catalyst and also promotes undesirable side reactions which yield products of no known use and value. If, therefore, it is desired to recycle unreacted aldehyde from the final reaction mixture, that aldehyde must be free from water. However, at least in the cases of acrolein and methacrolein, an aldehyde-water azeotrope is formed by the aldehyde, so that it is very difficult as a practical matter to obtain the anhydrous aldehyde. Consequently, any procedure used to recover the unreacted aldehyde must not involve the use of water. This fact limits, as a practical matter, the usefulness of the procedure taught by the Hearne-Schwarzer patent, for that procedure requires that the final reaction mixture first be treated with water to destroy the aluminum alcoholate catalyst, and then the product monomer ester and unreacted aldehyde be recovered from the resulting reaction mixture. A further objection to such a procedure is this: if it is desired to hydrolyze the spent catalyst so as to recover from that catalyst the alcohol moieties thereof, hydrolysis of the catalyst in the crude mixture adds a further component—the alcohol—to that mixture, necessitating a further step for recovery of that component, and complicating recovery of the other components of that mixture.

The Bludworth patent suggests that the aluminum alcoholate be removed by filtration. This procedure is not practically feasible in many, if not all cases, for at least two reasons: first, in many, if not all cases, at the end of the condensation reaction the catalyst is present in the final reaction mixture in the form of very small solid particles—often of colloidal dimensions—so that removal of the catalyst, as by filtration or centrifugation, is often very difficult. Second, and perhaps more important, the aluminum alcoholates are soluble to some extent in the reaction mixture and there is evidence that it is the soluble portion of the aluminum alcoholate that is the active catalyst for the condensation of the aldehyde. Consequently, removal of the catalyst by centrifugation or filtration would not effect separation and recovery of the product monomer ester and unreacted aldehyde from the dissolved portion of the catalyst.

To enable the condensation of alpha-methylidene aldehydes to valuable monomeric products, on a large scale as a practical matter, it is therefore essential that there be available some process for effecting substantially complete recovery of the product monomer ester and unreacted aldehyde in anhydrous form from the final reaction mixture, without reduction in the yield of either the ester or the aldehyde.

We now have made a discovery which provides just such a process. We have found that, contrary to what would be expected, the product monomer ester and unreacted aldehyde can be separated from the catalyst in the final reaction mixture by distilling that mixture at such conditions that the ester and aldehyde are rapidly distilled overhead. This discovery was wholly unexpected. The aldehyde reactants are highly reactive, especially in the reaction mixture containing the catalyst, so that prior to our discovery, we expected that any attempt to distill the crude reaction mixture would cause various reactions, involving at least the unreacted aldehyde, most of which reactions would produce polymeric products of no known use or value. Contrary to our expectations, however, we found that the ester and the unreacted aldehyde could be distilled from the reaction mixture without any substantial undesired reaction of either, provided that the distillation was carried out very rapidly. By proceeding in this manner, substantially all of the ester and aldehyde present in the crude reaction mixture (as determined by analysis of that mixture) can be recovered.

Our discovery thus provides a simple, effective process for separating and recovering product monomer ester and unreacted aldehyde from aluminum alcoholate catalyst in the final reaction mixture obtained on condensation of an alpha-methylidene aldehyde by an aluminum alcoholate. The process does not involve use of water, so that the unreacted aldehyde is obtained in anhydrous state suitable for direct recycle for the production of additional valuable monomeric products.

A further advantage provided by our discovery is that the separated aluminum alcoholate catalyst can be hydrolyzed and the resulting alcohol recovered separately, thus further simplifying recovery of the monomeric products resulting from the aldehyde condensation process.

The new process is applicable to the recovery of product monomer ester and unreacted aldehyde from the final reaction mixture resulting from the general process of condensing alpha-methylidene aldehydes by aluminum alcoholates. However, the new process is of particular value when applied to the process for effecting the condensation of acrolein which is described in copending application Serial No. 783,094, mentioned hereinbefore. Accordingly, the orientation of our invention—its setting and relation to the art—and the following description of its application in practice, will be set out as it relates to the process described in Serial No. 783,094. It is to be noted that this technique of description is used only for the purpose of brevity and clarity of description of the process of the invention, and is not to be construed as limiting the usefulness of the invention. As already pointed out, our new process provides a general method for recovery of the product ester and unreacted aldehyde resulting from the general process comprising the aluminum alcoholate catalyzed condensation of alpha-methylidene aldehydes, particularly alpha-methylidene alkanals.

A detailed description of the preferred method for conducting condensation of acrolein is, of course, set out in Serial No. 783,094. Since that process does not form a part of, or go to the essence of the present invention, a detailed description of that process will not be included herein. However, to provide the setting for the present invention, and to show the manner in which the present invention is used, the process of Serial No. 783,094 will be briefly described herein, and the disclosures of Serial No. 783,094 are hereby incorporated into and made a part of this specification.

Briefly, the process of Serial No. 783,094 requires that acrolein be reacted under substantially anhydrous conditions in the presence of an aluminum alcoholate, and optionally an inert solvent, the reaction being terminated when the conversion of acrolein has progressed to a substantial, yet limited extent. The extent of the acrolein conversion permitted is determined by the requirement that the product or products of the conversion be monomeric, not polymeric. The reaction is terminated at or just before the point at which polymeric products begin to form in substantial amounts. The amount of catalyst used preferably is less than about 0.05, but greater than about 0.001 mole per mole of the acrolein charged. The reaction preferably is conducted at a temperature of about 30° C. (e.g., from about 15° C. to about 45° C.). To obtain substantially quantitative yield (that is, 95% or more) of monomeric products, the maximum conversion of acrolein permitted is about 18%, about 30% and about 55%, respectively, at catalyst concentrations of about 0.001, 0.01 and 0.05 mole per mole of acrolein, respectively, other values being determined by interpolation or extrapolation of one of the smooth curves joining the cited values. The preferred catalysts are the alcoholates of aluminum and isopropyl alcohol and secondary butyl alcohol, respectively.

According to our discovery, the reaction is terminated when desired, and the ester product and unreacted aldehyde are recovered by distillation of the reaction mixture. The distillation is conducted under such conditions that the ester and unreacted aldehyde are rapidly distilled overhead and thus separated from the catalyst. The distillation is most conveniently conducted by rapidly distilling overhead all of the materials in the reaction mixture boiling at a temperature lower than the temperature at which the aluminum alcoholate boils. These more volatile materials include the ester product, unreacted aldehyde, ketone or aldehyde formed by reaction of the aldehyde reactant with the catalyst, and solvent if used. It is desirable that the distillation from the reaction mixture of the materials boiling below the aluminum alcoholate be conducted as rapidly as possible, for the more rapidly those materials are separated from the reaction mixture, the more effective the separation.

Any suitable pressure may be used in effecting the distillation. The temperature at which the distillation is conducted should not exceed about 60° C., and should be as low as is practically possible, since the reaction mixture contains highly reactive materials and a highly active catalyst. Under these circumstances, some form of vacuum distillation is normally convenient and effective. The technique of vacuum distillation commonly known as "flash distillation" or "flashing" is often most convenient. In using this technique, the pressure on the reaction mixture, which is at a suitable temperature, is suddenly and substantially reduced, so that the volatile materials therein rapidly vaporize, and are removed overhead. A most convenient, and effective, way of conducting the distillation is to flash distil the reaction mixture at the temperature used in the reaction. Thus, the reaction is conducted until the required conversion of acrolein is obtained, then the pressure on the mixture is rapidly reduced, and the volatilized materials taken overhead. Physically, the reduction in pressure can be effected by simply reducing the pressure in the reaction vessel, or the reaction mixture can be transferred from the reaction vessel to another vessel maintained at the necessary lower pressure. To minimize possible side reactions, the reduction in the pressure is effected as quickly as possible.

In some cases, it may be found desirable that there be present in the mixture to be distilled an entraining or azeotroping agent for either or both of the ester product and the unreacted aldehyde. In many, if not all cases, the solvent used in effecting condensation of the aldehyde also will act as the entraining or azeotroping agent. If no solvent is used in effecting condensation of the aldehyde, the solvent may be added just before the distillation to aid in removal of the ester product and/or the unreacted aldehyde. Suitable entraining or azeotroping agents are the materials suitable as solvents in the condensation of the aldehyde. The material chosen as solvent and/or entraining or azeotroping agent preferably boils at a temperature substantially different from the boiling points of the ester product, the unreacted aldehyde and the aluminum alcoholate used as catalyst. These requirements must be met in order that the solvent and/or entraining agent can be readily separated from the other components of the system. The preferred entraining or azeotroping agents are the aromatic hydrocarbons, such as benzene, toluene, xylenes, and the like, or mixtures of such aromatic hydrocarbons, of appropriate boiling point, or boiling point ranges.

Separation of the components of the overhead distillation product can be effected by known methods, fractional distillation being most convenient in the majority of cases. Proper selection of the solvent and/or entraining agent will simplify the seperation. Since no water is used in, or formed in, the condensation of the aldehyde and since no water is used in the resolution of the reaction mixture according to our invention, the recovered aldehyde and the solvent and/or entraining agent, if used, will be substantially anhydrous and can be directly recycled for further use in condensation of the aldehyde, if desired. Likewise, the ester product and ketone formed by reaction of the aldehyde and the catalyst will be substantially anhydrous.

It may be found desirable to re-use the catalyst. In some cases, the separated catalyst can be used directly without further treatment to catalyze further condensation of an aldehyde. In other cases, however, the bottoms product of the flash distillation will be composed of catalyst and "heavy ends," which are organic materials, primarily polymeric, that have been formed during condensation of the aldehyde. The pure catalyst may be recovered by suitable orthodox methods, including distillation, extraction and the like. In some cases, it may be found that the recovered catalyst is unsuitable for further condensation of an aldehyde. In such cases, it is desirable that the organic portion of the aluminum alcoholate catalyst be recovered, since the organic portion of the catalyst is a valuable by-product. Recovery of the organic portion of the catalyst is effected by hydrolysis of the catalyst, with about a stoichiometric amount, or a slight excess of either water, or an aqueous solution of a strong base, such as sodium hydroxide or an aqueous solution of a strong acid, such as sulfuric acid. The aluminum is recovered as aluminum hydroxide, a metal aluminate or an aluminum salt. The organic portion of the catalyst is recovered as one or more alcohols, but primarily as the unsaturated alcohol corresponding to the alpha-methylidene aldehyde condensed. Recovery of the alcohol(s) from the hydrolysis mixtures can be effected by known methods, as by distillation, extraction, filtration or centrifugation to remove the aluminum compound, then distillation or extraction of the alcohol(s) as may be necessary.

The foregoing constitutes a general description of our discovery and the process which embodies it. Application of that process in particular instances is illustrated by the following examples. It is to be understood that these examples are included only for the purpose of illustrating our invention, and are not intended, or to be construed, as limiting that invention in any way not specifically recited in the appended claims.

*Example I*

In this experimental work, condensation of acrolein was effected by mixing a solution of tri(sec-butoxy)aluminum in xylene with the acrolein, the weight of solvent being 30% of the weight of the acrolein, and the catalyst concentration being 0.01 mole per mole of the acrolein. The mixture was maintained at 30° C. for 3 hours. The mixture then was flashed at 1 millimeter mercury pressure. 23.3% of the acrolein was converted. There was obtained a yield of allyl acrylate of 87.2%. This represented essentially a 100% recovery of the allyl acrylate shown by analysis of the mixture to be present in the reaction mixture. On hydrolysis of the catalyst, a yield of 12.8% allyl alcohol was obtained.

*Example II*

Acrolein was condensed by maintaining a mixture of acrolein and tri(sec-butoxy)aluminum (0.007 mole of tri(sec-butoxy)aluminum per mole of acrolein) at 20° C. for 1.5 hours. The mixture then was flashed at 1 millimeter mercury pressure. Conversion of acrolein was 20.4%. The yield of allyl acrylate was 89%. This represented essentially 100% recovery of the allyl acrylate present in the reaction mixture. On hydrolysis of the catalyst, a yield of 10% allyl alcohol was obtained.

*Example III*

381 parts by weight of methacrolein were mixed with 30 parts by weight of tri(methallyloxy)aluminum in 88 parts by weight of benzene, and the mixture was maintained at 15–16° C. for 2 hours, then at room temperature for 96 hours. The mixture then was flashed at 5 millimeters mercury pressure. 71% of the methacrolein was converted. A yield of 85% methallyl methacrylate, representing essentially 100% recovery of the methallyl methacrylate in the reaction mixture, was obtained.

We claim as our invention:

1. A process for preparing predominantly an alkenyl acrylate from a corresponding alpha-methylidene alkanal selected from the group consisting of acrolein and methacrolein which comprises, (1) condensing the alpha-methylidene alkanal predominantly to the corresponding alkenyl acrylate under substantially anhydrous conditions and at a temperature up to about 45° C. in the presence of aluminum alcoholate in an effective catalytic amount of from about 0.001 to about 0.05 mole per mole of the methylidene alkanal for a time substantially short of complete conversion of the alkanal and short of production of a substantial amount of polymeric product and (2) immediately substantially reducing the pressure on the resulting crude reaction mixture and at this reduced pressure rapidly distilling overhead at a temperature not exceeding about 60° C. those components of said mixture boiling below the boiling temperature of the aluminum trialcoholate.

2. A process according to claim 1 wherein the alpha-methylidene alkanal is acrolein.

3. A process according to claim 1 wherein the alpha-methylidene alkanal is methacrolein.

4. A process according to claim 1 wherein said distillation is carried out at reduced pressure at a temperature not exceeding the reaction temperature.

5. A process in accordance with claim 1 wherein the condensation in step (1) and the distillation in step (2) are carried out in the presence of an effective solvent and azeotroping amount of an aromatic hydrocarbon.

References Cited in the file of this patent

UNITED STATES PATENTS

| | | |
|---|---|---|
| 2,412,469 | Nicholl et al. | Dec. 10, 1946 |
| 2,516,627 | Hearne et al. | July 25, 1950 |
| 2,774,792 | Carlson et al. | Dec. 18, 1956 |

FOREIGN PATENTS

| | | |
|---|---|---|
| 1,288 | Great Britain | Dec. 9, 1915 |
| 863,939 | Germany | Jan. 22, 1953 |

OTHER REFERENCES

Hine: "Physical Organic Chemistry," 1956, pages 261–263.